Patented Feb. 15, 1938

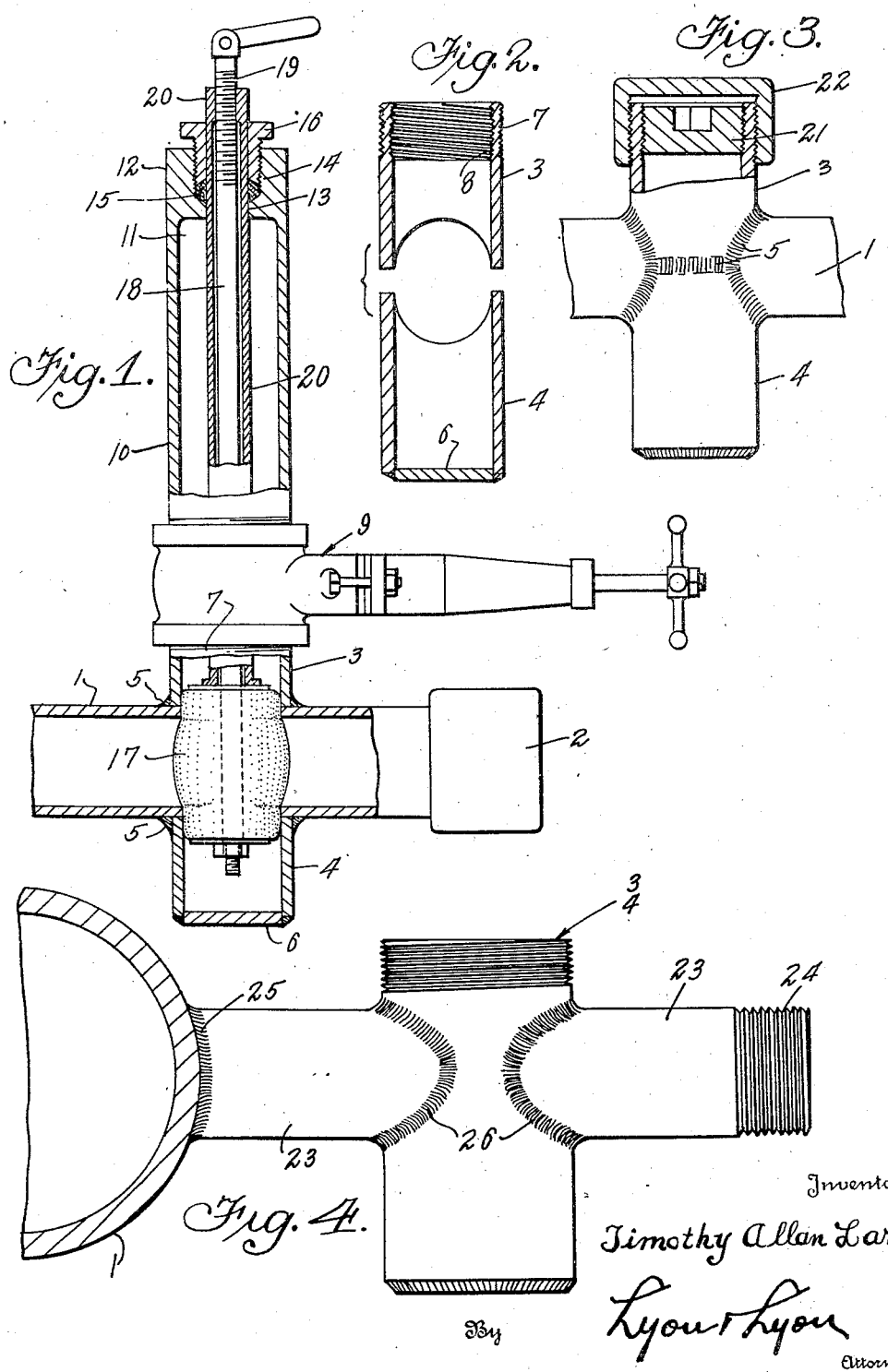
Feb. 15, 1938. T. A. LARRY 2,108,068
PRESSURE CONTROL FITTING
Filed Oct. 15, 1934

2,108,068

UNITED STATES PATENT OFFICE 2,108,068

PRESSURE CONTROL FITTING

Timothy Allan Larry, Los Angeles, Calif.

Application October 15, 1934, Serial No. 748,357

11 Claims. (Cl. 138—92)

My invention relates to pressure control fittings, and has particular reference to a fitting adapted to be used for controlling the pressure within a pipe when it is desired to repair or extend said pipe, or to make taps thereon.

In the distribution of fluids in pipe systems, it frequently occurs that some portion of the pipe requires extension, or repairing, or replacement, or it is necessary to tap the pipe or main for the purpose of extending a distribution line therefrom in a new direction. Heretofore, it has been necessary to stop the flow of fluid through the pipe or main, or to cut off from the supply that section of the main to which repair, or extension, is to be made.

In ordinary distributing systems, the nearest shutoff valve which could be employed for shutting off a given section of the main, may be located some considerable distance from the point from which the repair or extension is to be made, and, it is, therefore, inconvenient to shut down a long section of the line, rendering the entire section of the line inoperative during the time it is necessary to make the replacement, repair, or extension.

It is, therefore, an object of my invention to provide a device which may be attached to the main by which fluid in the main may be cut off at the point at which the repair or extension is to be made.

Another object of the invention is to provide a fitting which may be attached to the main without interrupting the supply of fluid therein, and through such fitting tapping the main and shutting off the supply at the point at which the fitting is attached.

Another object of the invention is to provide a pressure control fitting adapted to be readily secured to a main at any point thereon, through which the fluid supply in the main may be shut off or controlled to permit a section of the main to be removed, replaced or extended.

Another object of the invention is to provide a fitting of the character described, in which the fitting may be attached to the main as an extension fitting, through which the pipe or main may be tapped and the fluid in the extension controlled to permit the attachment of further extension to the attachment fitting.

Other objects and advantages will be apparent from a study of the following specifications, read in connection with the accompanying drawing, wherein—

Figure 1 is an elevational view, partly in section, of a pressure control fitting constructed in accordance with my invention;

Figure 2 is a detail, sectional view of pipe attachments which may be used in the practice of my invention;

Figure 3 is a detail, elevational view, partly in section, illustrating the finished attachment of my fitting to a main, after the extension or repair has been accomplished and the attachment closed off; and Figure 4 is an elevational view of a modified form of attachment which may be used for tapping a main to carry a new distribution pipe from the main without disturbing the flow of fluid in the main.

Referring to the drawing, I have illustrated in Figure 1 a pipe 1 which may constitute a main such as is used for the distribution of water, gas, oil, steam, or the like, such main being formed of a section of pipe of the desired diameter. As is illustrated in Figure 1, the main 1 terminates in a cap 2 representing the "dead end" of the main.

Assuming that it is desired to extend the main from the original "dead end" point to some further point, it would, under ordinary conditions, be necessary to shut off the fluid in the main 1 at some distant point where a shutoff valve had previously been interposed in the main. Then it would be necessary to uncover the main 1, take off the cap 2 and then drain such fluid as remained in the main 1, after which the extension of the main may be accomplished by attaching a new length of pipe to the end of the main 1.

In handling certain fluids, however, such as gas, gasoline, oil or other combustible fluids, the removal of the cap 2 and the draining of such gas or oil as remains therein is exceedingly dangerous to the workmen employed for extending or repairing the main, as such fluid would have to be drained off into the atmosphere or the surrounding ground with grave danger of its igniting and burning the workmen or of the quantity of gas escaping and injuring the workmen by asphyxiation. This danger can be obviated by the employment of a fitting which may be attached to the main 1 without opening the main, and I have illustrated such fitting as including an upper member 3 and a lower member 4 which are preferably formed as short sections of pipe which may be attached above and below the main 1 by any suitable means, such as welding 5. I prefer that the internal diameter of the members 3 and 4 should be in excess of the internal diameter of the main 1 to which attachment is to be made, so that when the members 3 and 4 are attached to the main the entire cross section of the main may be drilled out by drilling down through the interior of the members 3 and 4.

It will be observed that the lower member 4 is provided with a closed end 6, while the upper member 3 is provided upon its exterior with threads 7 and it also has threads extending interiorly, as indicated at 8.

As will be understood by those skilled in the art, the threads 7 may be employed for the attachment of a temporary gate valve 9, such attachment being made prior to the drilling of any opening into the main 1. To the upper side of the valve 9 may be attached a working chamber 10, preferably formed of an elongated tube having an internal bore 11 terminating near the upper end 12 thereof, which is in turn provided with a smaller bore 13 through which the shafts for drills, taps, or other devices may extend. The upper end 12 of the chamber fitting 10 is preferably provided with a stuffing box 14, including packing 15 and a packing gland 16.

As will also be understood by those skilled in the art, drills and taps may be inserted in the chamber member 10 and the stuffing box tightened around the shafts thereof, after which the chamber member 10 may be screwed upon the gate valve 9 with the drills or taps therein. Thereafter the gate valve 9 may be opened and the drills may be moved downwardly through the gate valve 9 and the upper member 3 of the fitting and the pipe or main 1 may be drilled without the loss of fluid and without interrupting the supply of fluid in the main 1.

It will be observed that by reason of the larger diameter of the members 3 and 4 and the employment of the lower fitting 4, the drill may cut out the metal both at the top and at the bottom of the main 1 to provide a passageway through the main 1, into which a suitable cutoff plug 17 may be inserted.

The cutoff plug 17 preferably comprises a cylindrical block of rubber or other compressible material which has an external diameter slightly less than the internal diameter of the members 3 and 4, but which when compressed will expand it along its diameter to completely fill the cross section of the main 1.

It will be observed that the plug 17 is preferably longer than the internal diameter of the main 1 so that when in place within the fittings 3 and 4 it will extend a considerable distance above and below the main 1, thus insuring a positive filling of the entire cross section of the main and preventing the pressure of fluids in the main from distorting the plug 17 and opening small cracks or spaces through which fluid can leak beyond the plug 17. The lower fitting 4 forms a chamber below the main of considerable length into which the end of the plug 17 may project and also provides a space below the plug into which any bits of metal of the main, not completely removed during the drilling operation, may fall out of the way of interference with the proper seating of the plug in the main.

In order to insert and control the plug 17 I prefer to mount the block upon a rod 18, the upper end of which is threaded as at 19 to a tubular compressor 20, the lower end of which rests upon the upper end of the plug 17. The plug 17 may be placed on the rod 18 and the compressor 20 screwed onto the rod 18 until the lower end of the compressor rests lightly on the plug. The assembled rod, compressor, and plug may then be inserted into the chamber 10, the upper ends of the rod 18 and compressor 20 extending out through the stuffing box 14. Then the chamber fitting 10 may be screwed upon the gate valve 9, the gate valve opened and the entire assembly pressed down into place in the main 1. Then the rod 18 may be rotated relative to the compressor 20 to pull the compressor and rod toward each other, expanding the plug 17 into tight relation with the walls of the members 3 and 4.

When the plug 17 has been so placed, the cap 2 on the main 1 may be removed, or that portion of the main 1 which lies beyond the plug 17 may be cut out and replaced or extended or expansion fittings may be secured to that portion of the main as desired for the repair or extension of the distribution system. This may be done without loss of fluid in the pipe except such amount as lies between the relatively short distance between the plug 17 and the point at which the extension or repair is to be made.

Since the fitting is attachable to any portion of the main, it will be understood by those skilled in the art that a single excavation to expose the pipe at the point at which the extension or repair is to be made will suffice for the attachment of the fitting and the plugs which are to be placed may be selected within a few inches from the point at which the main is to be opened or cut or extended.

When the extension or repair has been completed the plug 17 may be loosened and drawn up into the gate valve 9 and into the chamber fitting 10; then the gate valve may be closed and the chamber fitting 10 with the plug may be entirely removed. A wrench may be inserted in place of the compressor 20 to which may be secured a plug 21, the chamber fitting 10 again screwed onto the gate valve 9, the gate valve opened, and the plug 21 inserted through the gate valve into the internal threads 8 of the upper member 3, thus positively sealing off the member 3 from the escape of any fluid. Thereafter the gate valve 9 may be entirely removed and the repair or extension is complete. I prefer, however, to insure the closure of the upper chamber 3 by placing a cap 22 thereon to engage the external threads 7, thus doubly sealing the member 3 against the escape of fluid, and, further to cover and protect the external threads 7 against corrosion so that the fitting will be protected for future use at any time thereafter.

The plug, extending through both the upper and lower walls of the main, has a solid abutment at these two points and any pressure in the main presses the central part of the plug into the bore of the main, in tighter sealing relation, rather than tending to swing the plug away from the walls of the main as is the case when the plug extends through one wall of the main and is merely pressed against the opposite wall. Also, since the internal diameter of the members 3 and 4 is larger than the internal diameter of the main, the side walls of the main are at least partially cut away and when the plug is expanded to fill the cut out portion it is larger than the internal diameter of the main. Hence any pressure in the main is exerted tending to press a larger diameter plug into the smaller diameter of the fluid passage of the main, and such pressure therefore assists in the sealing of the main.

For the purpose of tapping, or making side extensions from the main 1, the device illustrated in Fig. 4 may be employed, in which the upper and lower members 3 and 4, similar to those illustrated in Figs. 1 to 3, may be secured in advance to a short length of pipe 23, one end of which is threaded as at 24, while the other end is adapted to be welded as indicated at 25 to the side wall of the main 1. In this form of the fitting the upper and lower members 3 and 4 may be formed integrally, that is, of a single short length of pipe or tubing, through which an opening is bored just sufficient to permit the insertion of the pipe 23, which is welded in place as indicated at 26, and then the pipe 23 is drilled out by a drill equal to the internal diameter of the members 3 and 4.

The fitting assembly thus formed when attached to the main 1 may be provided with a gate valve similar to gate valve 9 and a chamber member similar to that illustrated at 10. In this case, however, the drilling of the main 1 will take place through the pipe 23, the drilling devices being attached to the threaded end 24 of the pipe 23. When the drilling is complete, the drill may be withdrawn through the pipe 23 and a plug 17 inserted through the upper end of the upper fitting 3 in the same manner as described with reference to Figures 1 to 3. Thus the pipe 23 is effectively cut off from the escape of fluid through the opening now made in the main 1, and the extensions may be attached to the threaded end 24 of the pipe 23, as desired. Then, upon the completion of the extension, the plug 17 may be withdrawn and the fittings 3 and 4 may be plugged and capped as described with reference to Figures 1 and 3.

It will be observed that once a fitting 3—4 is in place on the main it remains as a permanent fixture and may be employed at any time thereafter as a cutoff valve by the insertion of plug 17 therein.

In fact, it may be desirable in the initial construction of the line to place a number of the fittings 3—4 at strategic points along the line, it being understood by those skilled in the art that such fittings are relatively inexpensive, as compared with gate valves which are required to be placed along the mains at the present time. Thus, by the mere use of short sections of pipe attached to the main at a number of points therealong, provision is readily made in the construction of new lines for the extensions, repairs or replacements required by the maintenance of the main without involving any considerable investment in valves or other cutoff devices which would otherwise be required to be buried with the main.

It should also be observed that at any future time, when it is desired to use the fittings 3 and 4, the collection of debris in the main 1 will not interfere with their use, since the lower member 4 constitutes a sump, permitting the insertion of scraping tools, through stuffing box chamber fittings 10, to scrape or break up any deposits which may then be blown out by permitting the escape of small quantities of the contents of the pipe due to its own pressure.

While I have shown and described the preferred embodiment of my invention, I do not wish to be limited to any of the details of construction shown herein, except as defined in the appended claims.

Subject matter, which is not claimed in the present application, is claimed in my copending divisional application Serial No. 168,475, filed October 11, 1937.

I claim:

1. In a device as described, a hollow valve housing having a cylindrical inside surface, one end being closed and the other end open, the housing having lateral openings for pipes entering through the cylindrical surface, the said surface extending below and above the said openings, the opening opposite the closed end being adapted for the insertion of an expansible cylindrical valve.

2. In a device of the class described, a fitting comprising a pair of tubular members, one end of each of the tubes being adapted to partially encircle opposed pipe ends, the remaining ends of one of said tubular members being open and the other closed, said tubular members being adapted to be aligned transversely of the said pipes and secured to the latter to form a housing, the opening opposite the closed end being adapted for the insertion of an expansible cylindrical valve.

3. In a device as described, a pipe having a hollow intersecting structure, the intersecting structure being closed at one end and having an opening at the opposite end and being cylindrical substantially from the opening to the closed end, the said cylinder intersecting the pipe, and an expandible valve plug insertable in the opening and within a cut-out portion provided in the pipe and adapted to be expanded into sealing engagement with the latter.

4. In a device for controlling flow in a pipe, a tubular fitting attached to and extending upon opposite sides of said pipe, said pipe being apertured within the fitting to provide a passageway between opposite portions of the fitting, and a plug insertable in said passageway and extending into opposed portions of the fitting, said plug adapted to be expanded into sealing engagement with said pipe for closing off flow in said pipe.

5. In a device for controlling flow in a pipe, a tubular fitting attached to and extending around said pipe, said pipe being divided within the fitting to provide a passageway between opposed portions of the fitting, a plug insertable in said passageway and extending into recesses in the opposed portions of the fitting and adapted to be expanded for closing off the pipe.

6. In a device for controlling flow in a pipe, a tubular fitting attached to and extending upon opposite sides of said pipe, said pipe being apertured within the fitting to provide a passageway between opposite portions of the fitting, and a plug insertable in said passageway and adapted to extend into opposed portions of the fitting, said plug adapted to be expanded into sealing engagement with said pipe and fitting walls for closing off flow in said pipe.

7. A shut-off device for a pipe comprising casing means attachable to the pipe and sealing with the pipe at longitudinally spaced apart points thereon, whereby a section of the pipe within the casing may be removed leaving juxtaposed pipe ends within the casing and at least in part supported by the casing, said casing means comprising wall means defining a cylindrical bore of larger diameter than the bore of the pipe and intersecting the pipe and extending therebeyond on opposite sides, and a resilient expansible plug insertable into said casing, said plug comprising a radially expansible cylindrical member of length substantially greater than the external diameter of the pipe and adapted to be centered with respect to the pipe, whereby it projects beyond the pipe at both ends and may be expanded into sealing engagement therewith.

8. A shut-off device for a pipe comprising casing means attachable to the pipe and sealing with the pipe at longitudinally spaced apart points thereon, whereby a section of the pipe within the casing may be removed leaving juxtaposed pipe ends within the casing and at least in part supported by the casing, a resilient expansible plug insertable into said casing between the juxtaposed ends of said pipe, and means for expanding said plug into sealing engagement with the juxtaposed ends of said pipe and the walls of said casing.

9. A device as described in claim 8, in which said casing means comprises wall members defining a cylindrical bore of larger diameter than the bore of the pipe and intersecting the pipe and extending therebeyond on opposite sides and in which said plug comprises a radially expansible cylindrical member of length substantially greater than the external diameter of the pipe and adapted to be centered with respect to the pipe, whereby it projects beyond the pipe at both ends and may be expanded into sealing engagement therewith.

10. A device as described in claim 8, in which said plug comprises a body of resilient material and said means for expanding said plug comprises a pair of compressing members abutting against opposite ends of said plug, a hollow sleeve attached to one of said compressing members, the latter having an aperture therein aligned with the sleeve, a rod extending through said sleeve and said one compressing member and said body and attached to the other compressing member, and cooperating screw threads on said rod and sleeve for drawing said compressing members together in response to relative rotation between said rod and sleeve.

11. In pressure control apparatus, fitting members attachable above and below a main, a chamber member for the reception of tools attachable to said fitting members, expansible plug means insertable through said chamber member and into said fitting members to engage said fitting members above and below said main and means for expanding said plug after insertion into said fitting members to close off said main at said fitting members.

TIMOTHY ALLAN LARRY.